United States Patent
Yu et al.

(10) Patent No.: US 9,104,303 B2
(45) Date of Patent: Aug. 11, 2015

(54) COMPUTER DEVICE WITH TOUCH SCREEN AND METHOD FOR OPERATING THE SAME

(75) Inventors: Ying-Chen Yu, Taipei (TW); Jacqueline Li-Ling Yen, Taipei (TW); Po Ya Chuang, Taipei (TW); Wendy Ping Wen Wang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 13/219,078

(22) Filed: Aug. 26, 2011

(65) Prior Publication Data

US 2012/0050159 A1    Mar. 1, 2012

(30) Foreign Application Priority Data

Aug. 31, 2010  (TW) .............................. 99129414 A

(51) Int. Cl.
*G06F 3/041*  (2006.01)
*G06F 3/0488*  (2013.01)

(52) U.S. Cl.
CPC .................... *G06F 3/0488* (2013.01)

(58) Field of Classification Search
USPC .................. 345/156, 157, 173–179
See application file for complete search history.

(56) References Cited

U.S. PATENT DOCUMENTS

| | | | |
|---|---|---|---|
| 5,943,043 A | 8/1999 | Furuhata et al. | |
| 6,628,269 B2 | 9/2003 | Shimizu | |
| 6,727,892 B1 | 4/2004 | Murphy | |
| 7,020,270 B1 | 3/2006 | Ghassabian | |
| 2004/0021643 A1* | 2/2004 | Hoshino et al. | 345/173 |
| 2007/0182663 A1* | 8/2007 | Biech | 345/1.1 |
| 2008/0012835 A1 | 1/2008 | Rimon et al. | |
| 2008/0042983 A1 | 2/2008 | Kim et al. | |
| 2008/0122796 A1 | 5/2008 | Jobs et al. | |
| 2008/0204427 A1 | 8/2008 | Heesemans et al. | |
| 2008/0252616 A1 | 10/2008 | Chen | |
| 2010/0031203 A1 | 2/2010 | Morris et al. | |
| 2010/0073563 A1 | 3/2010 | Painter et al. | |
| 2010/0146459 A1 | 6/2010 | Repka | |
| 2010/0149114 A1 | 6/2010 | Li | |
| 2010/0171753 A1* | 7/2010 | Kwon | 345/593 |

FOREIGN PATENT DOCUMENTS

KR    1020100033076    3/2010

OTHER PUBLICATIONS

Brewster et al., "Pressure-Based Text Entry for Mobile Devices," MobileHCI'09, Sep. 15-18, 2009, pp. 1-4.

(Continued)

*Primary Examiner* — Dennis Joseph
(74) *Attorney, Agent, or Firm* — Holland & Knight LLP; Brian J. Colandreo, Esq.; Jeffrey T. Placker, Esq.

(57) ABSTRACT

A method for operating a computer device incorporating a touch screen is provided. The method includes pre-defining a first pointing device command and a second pointing device command, which are not related to directional pointing control, in the computer device. In response to a first touch, the touch screen generates a first touch signal. The first pointing device invokes a command in response to the first touch signal. In response to a second touch different from the first touch, the touch screen generates a second touch signal. The second pointing device command is invokes in response to the second touch signal.

13 Claims, 4 Drawing Sheets

(56) References Cited

OTHER PUBLICATIONS http://www.n-trig.com/content.aspx?Page=PressVideo, Video clips—N-trig., downloaded Aug. 7, 2010, pp. 1-3.

Buxton, "Multi-Touch Systems That I Have Known and Loved," http://www.billbuxton.com/multitouchOverview.html, downloaded May 30, 2009, pp. 1-10.

* cited by examiner

COMPUTER DEVICE WITH TOUCH SCREEN AND METHOD FOR OPERATING THE SAME

RELATED APPLICATION

This application claims the right of priority based on Taiwan Patent Application No. 99129414, entitled "Computer Device with Touch Screen and Method for Operating the Same", filed on Aug. 31, 2010. The entire contents of the aforementioned application are incorporated herein by reference.

FIELD OF THE INVENTION

The present invention relates to a computer device with touch screen and a method for operating the same.

BACKGROUND OF THE INVENTION

More and more computer devices are equipped with touch screens. In general, touch screens are classified into capacitive type, resistive type, acoustic type, and optical type. For example, Acer™ Gateway ZX6810 from Acer company and iPhone™ from Apple company adopt the capacitive-type touch screens, and T91 Tablet from ASUS company, 1420P-232G32n from Acer company, and N800 Internet Tablet from Nokia company adopt the resistive type touch screens.

In response to the usage of touch screen, iPhone™ provides a virtual keyboard, wherein different texts such as capital letters and lower case letters can be inputted according to the longer or shorter touch duration. Moreover, in the article titled "*Pressure-based text entry for mobile devices*" by Stephen A. Brewster and Michael Hughes, Proceedings of the 11th International Conference on Human-Computer Interaction with Mobile Devices and Services, Sep. 15-18, 2009, Bonn, Germany, it also suggested that virtual keyboard adopted in N800 Internet Table can input capital or lower case letters by different touch pressures.

SUMMARY OF THE INVENTION

According to one embodiment, a computer device includes a touch screen, an operating system, and a processor. The touch screen is configured to, in response to a first touch, generate a first touch signal, and in response to a second touch, generate a second touch signal, wherein the first touch and the second touch are different at least in pressure applied by the user. The operating system is configured to pre-define a first command and a second command. The processor is configured to, in response to the first touch, invoke the first command, and in response to the second touch signal, invoke the second command.

According to another embodiment, a method of initiating a command on a computer device having a touch screen includes in response a first touch on the touch screen, invoking a first command. In response to a second touch on the touch screen, invoking a second command. The first command and the second command are invoked by the application of unequal pressure on the touch screen.
According to an embodiment, a computer program product includes a computer-readable medium storing a program code to be executed on a computer. The program code causes the computer to, in response to a first touch on a touch screen of the computer, invoke a first command. The program code also causes the computer to, in response to a second touch on the touch screen, invoke a second command. The first touch and the second touch are different at least in pressure applied to the touch screen.

BRIEF DESCRIPTION OF THE DRAWINGS

In order that the invention will be readily understood, a more particular description of the invention briefly described above will be rendered by reference to specific embodiments that are illustrated in the appended drawings. Understanding that these drawings depict only illustrative embodiments of the invention and are not therefore to be considered to be limiting of its scope, illustrative embodiments of the invention will be described and explained with additional specificity and detail through the use of the accompanying drawings. In the drawings.

DETAILED DESCRIPTION OF THE INVENTION

Figure 1:
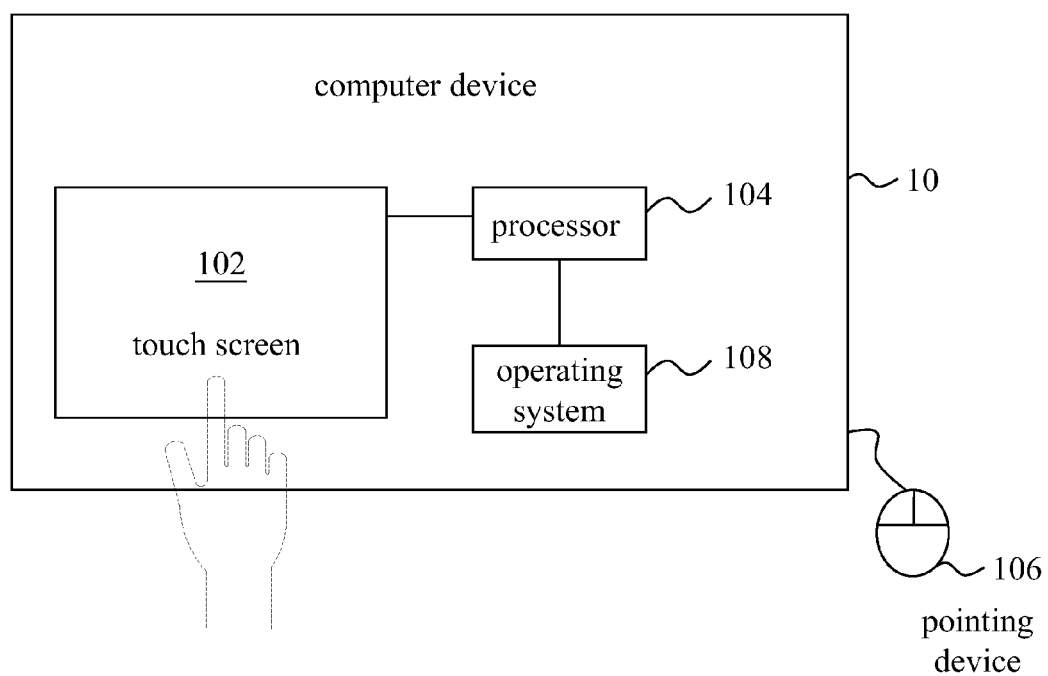
FIG. 1 illustrates a computer device allowing the user to utilize different forces in place of the conventional pointing device in accordance with one embodiment of the present invention.

Reference throughout this specification to "one embodiment," "an embodiment," or similar language signifies that a particular feature, structure, or characteristic described in connection with the embodiment is included in at least one embodiment. Thus, appearances of the phrases "in one embodiment," "in an embodiment," and similar language throughout this specification may, but do not necessarily, refer to the same embodiment.

As will be appreciated by one skilled in the art, the present invention may be embodied as a server, a computer apparatus, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 4, a system, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a block diagram of an illustrative embodiment of a computer device 10 that allows users to utilize different forces in place of the conventional pointing device. Particularly, the computer device 10 may have a touch screen 102, a processor 104, a pointing device 106 such as a mouse or track ball, and an operating system 108.

The basic configuration of the computer device 10 can refer to the computer product of ASUS™ T91 Table or Acer™ 420P-232G32n, or other computer product, wherein an example of the operating system 108 thereof can be Microsoft™ Window 7™.

Specifically, the touch screen 102 of the illustrative embodiment may be a resistive type touch screen that can sense the touch pressure applied by the user. With regard to the details of touch-sensing of the resistive type touch screen, those skilled in the art can refer to the article titled "Pressure-based text entry for mobile devices" by Stephen A. Brewster and Michael Hughes, which is incorporated herein by reference with its entirety.

Figure 2:
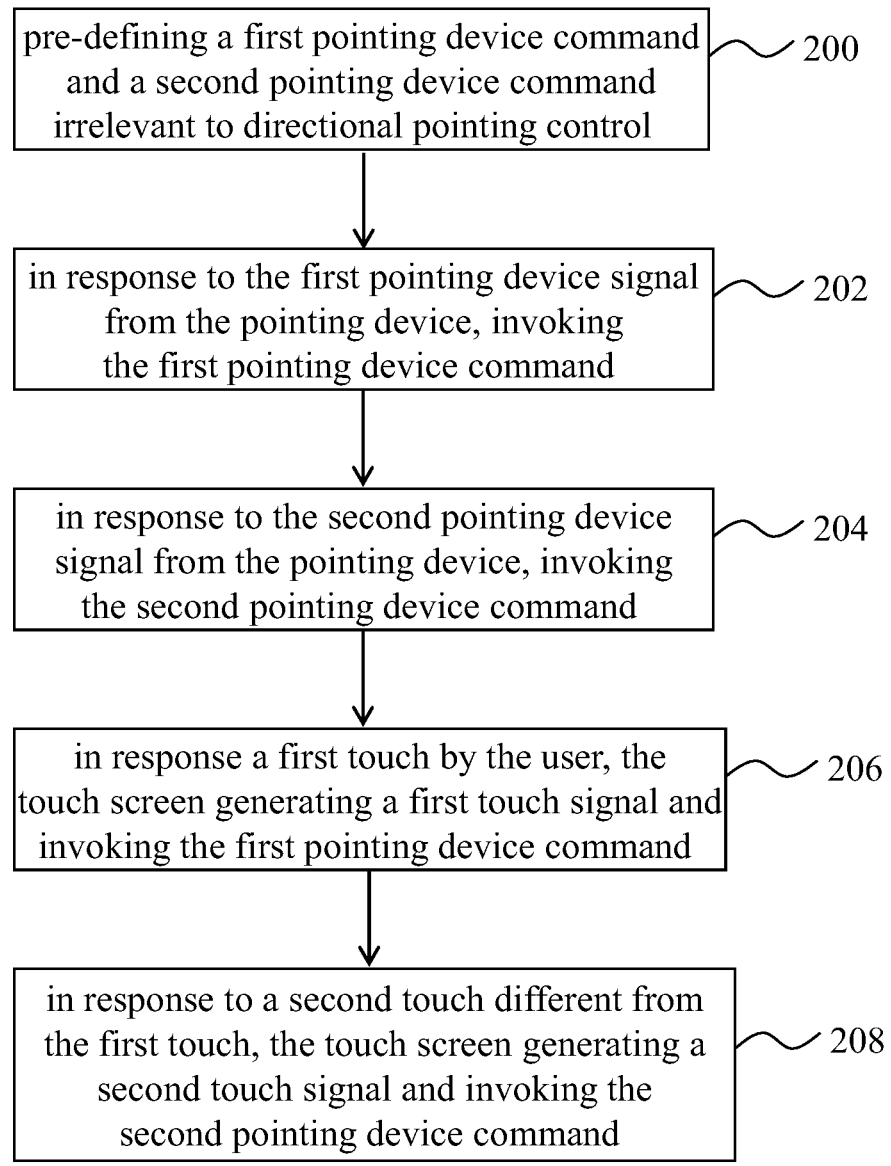
FIG. 2 illustrates a flowchart of a method for operating the computer device of FIG. 1.

FIG. 2 illustrates a flowchart of an illustrative method for operating the computer device 10 in one embodiment.

Step 200: the operating system 108 may pre-define a first pointing device command and a second pointing device command, wherein the first pointing device and the second pointing device command may be irrelevant to directional pointing control. Various applications executed on the operating system 108 can run different processes in response to the first pointing device command and the second pointing device command, respectively. For example, in a file management application, the first pointing device command executed with respect to a file may be to open the file, while the second pointing device command executed with respect to the file may be to call the function menu for the file.

Step 202: the user may operate the pointing device 106 to generate a first pointing device signal, and in response to the first pointing device signal, the processor 104 may invoke the pre-defined first pointing device command. For example, the user may double-click the left mouse button on the icon of a file (i.e. a graphic object) to generate a mouse double-click signal. The processor 104 may then invoke the pre-defined first pointing device command (i.e. the double-click command) to open the file.

Step 204: the user may operate the pointing device 106 to generate a second pointing device signal, and in response to the second pointing device signal, the processor 104 may invoke the pre-defined second pointing device command. For example, the user may double-click the right mouse button on the icon of a file to generate a right button signal. The processor 104 may then invoke the pre-defined second pointing device command (i.e. the right button command) to call the function menu for the file.

In addition to operations of the pointing device 106, the user can utilize the resistive type touch screen to perform operations.

Step 206: in response to a first touch, the touch screen 102 may generate a first touch signal, and in response to the first touch signal, the processor 104 may invoke the first pointing command. For example, the user may touch the icon of the file by a relatively smaller force to generate a first touch signal. The processor 104 may then invoke the pre-defined first pointing device command (i.e. the double-click command in Step 202) to open the file.

Step 208: in response to a second touch different from the first touch, the touch screen 102 may generate a second touch signal, and in response to the second touch signal, the processor 104 may invoke the second pointing device command. For example, the user may touch the icon of the file by a relatively larger force to generate a second touch signal. The processor 104 may then invoke the pre-defined second pointing device command (i.e. the right button command in Step 204) to call the function menu for the file. It is noted that any pressure applied by the user may be applicable to the present invention provided that the pressures given by the user in step 206 and step 208 can be distinguished by the touch screen 102. The value of pressure applied by the user is not limited in the described embodiments.

The present invention can also have other modifications. For example, during steps 202-208, the location of the file icon can be constant or variable and not limited in the described embodiments.

Furthermore, the first pointing device command and the second pointing device command are not necessarily associated with a specific graphic object. For example, in one application, processes irrelevant to the graphic object can be set in response to the first pointing device command and the second pointing device command, respectively. For example, when the user double-clicks on any location of the operating area or lightly touches the touch screen, the application may run as background. When the user hits the mouse right button on any location of the operating area or relatively heavily touches the touch screen, the application may be ended.

Figure 3:
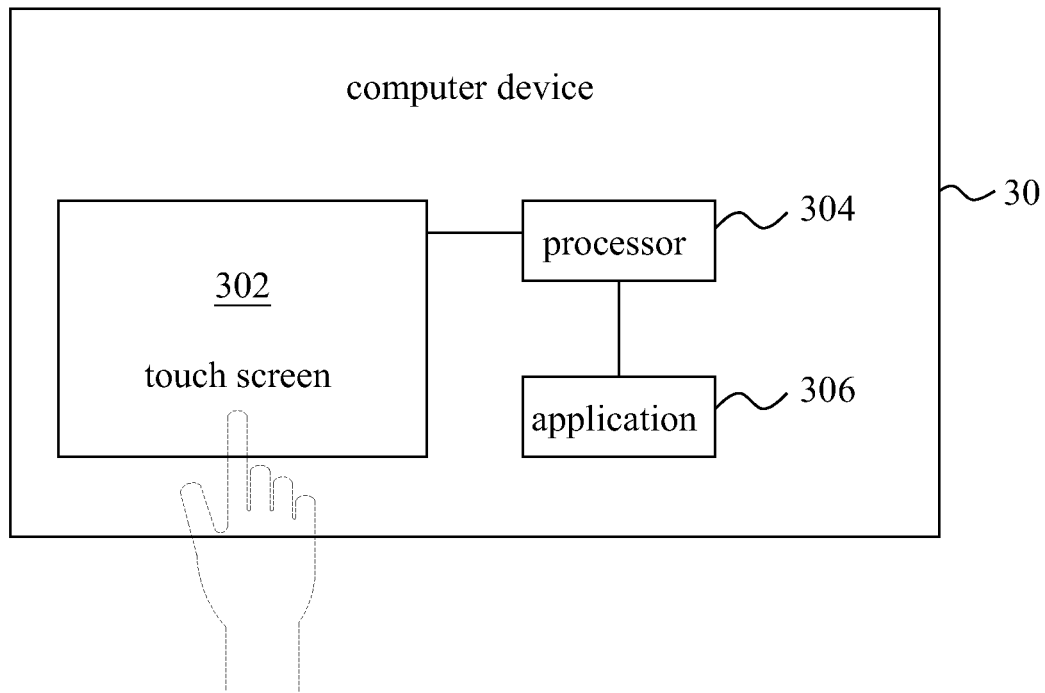
FIG. 3 illustrates a computer device for multimedia file browsing application in accordance with one embodiment of the present invention.

FIG. 3 illustrates a computer device 30 for multimedia file browsing application in one illustrative embodiment. Particularly, the computer device 30 may have a touch screen 302, a processor 304, and a multimedia file browsing application 306. The basic configuration of the computer 30 may refer to Apple™ iPhone™ or Nokia™ N800 Internet Tablet, or other computer device, wherein an example of the operating system used in the computer device 30 can be Apple iOS, or Nokia Maemo, or Google Android and not limited to the described embodiments.

It is noted that the touch screen 302 is not limited to resistive type and can be inductive type, surface acoustic type, or optical type.

Figure 4:
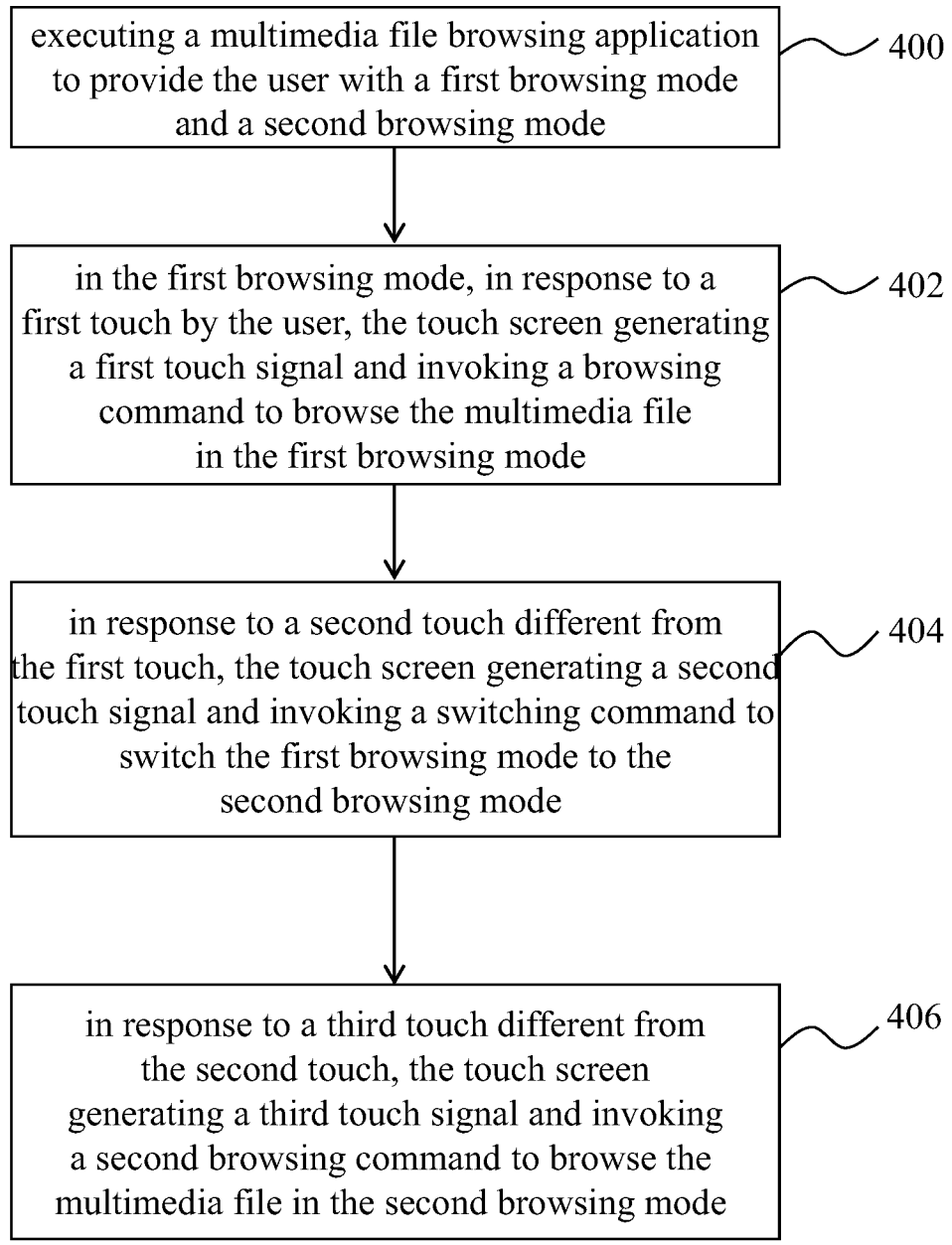
FIG. 4 illustrates a flowchart of a method for operating the computer device of FIG. 3.

FIG. 4 illustrates a flowchart of an illustrative method for operating the computer device 30 in one embodiment.

Step 400, the multimedia file browsing application 306 may be executed. The multimedia file browsing application 306 may provide the user with a first browsing mode and a second browsing mode. In the context of the present invention, different browsing modes may mean that the user can browse the content of the multimedia file by different ways, and under different browsing modes, same or different commands can be used for browsing the multimedia file. For example, the application 306 can be a reading program of an electronic book and can provide the user with vertical read mode and horizontal read mode, or page locking mode and page drag-able mode, or read-only mode and highlight and notation mode, or full page mode and column mode.

The application 306 also can be a photo-browsing mode to provide full screen mode or partial view mode.

The application 306 also can be a video-playing mode to provide Chinese subtitle mode or English subtitle mode or no subtitle mode.

The application 306 also can be an audio-playing program to provide normal mode or fast forward mode.

The electronic book read program together with vertical read mode and horizontal read mode thereof will be described below as an illustrative embodiment of the present invention.

Step 402: in the vertical read mode of the electronic book read program 306, the user can perform a first touch on the book page presented on the touch screen 302, and the touch screen 302 may correspondingly generate a first touch signal. In response to the first touch signal, the processor 304 may invoke a browsing command in the vertical read mode, such as jump to next page.

Step 404: in the vertical read mode of the electronic book read program 306, the user can perform a second touch different from the first touch of step 402 on the book page presented on the touch screen 302, and the touch screen 302 may correspondingly generate a second touch signal. In response to the second touch signal, the processor 304 may invoke a switching command to switch the vertical read mode to the horizontal read mode. In an illustrative embodiment, the touch in step 404 may not be limited to a specific touch position on the book page. Step 404 may perform the switching by a single touch without calling the menu for selection, thus increasing the convenience of use. Similarly, the user can perform the second touch once again to invoke the switching command to switch the horizontal read mode to the vertical read mode.

Step 406: in the horizontal read mode, the user can perform the first touch described above on the book page presented on the touch screen 302 to generate the first touch signal. In response to the first touch signal, the processor 304 may invoke the browsing command in the horizontal read mode, such as jump to next page. It is noted that the user also can perform a third touch that is different from the second touch in step 404 on the book page presented on the touch screen 302, and the touch screen 302 may correspondingly generate a third touch signal. In response to the third touch signal, the processor 304 may invoke a browsing command in the horizontal read mode, such as jump to the previous page. The browsing command in the horizontal read mode in step 406 is not necessarily the same as the browsing command in the vertical read mode in step 402.

It is worth to note that the difference between the touch in step 404 and the touch in step 402 (or the touch in step 406) may be the pressure applied by the user or the touch duration. Alternatively, the difference between the touch in step 404 and the touch in step 402 may be the pressure applied by the user, while the difference between the touch in step 404 and the touch in step 406 may be the touch duration. Moreover, the touch in step 406 and the touch in step 402 can be the same or different, but not limited to the described embodiments.

It is noted that the present invention can have other modifications. For example, the touch position in step 404 and the touch position in step 402 or 406 can be the same or different, and the touch position in step 402 and the touch position in the step 406 can be the same or different.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment may be included in an embodiment of the present invention. Thus, discussion of the features and advantages, and similar language, throughout this specification may, but do not necessarily, refer to the same embodiment, and need not necessarily be included in any embodiment consistent with the present invention.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The foregoing illustrative embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The invention claimed is:

1. A computer device, comprising:
    a pointing device configured to, in response to different operations by a user, generate a first pointing device signal, a second pointing device signal, and a third pointing device signal;
    a touch screen configured to, in response to a first human touch, generate a first touch signal, in response to a second human touch, generate a second touch signal, and in response to a third human touch, generate a third touch signal, wherein the first human touch, the second human touch, and the third human touch are different at least in pressure and duration of time applied by a user;
    an operating system configured to pre-define a first command, a second command, and a third command, in response to the different operations by the user of the pointing device that generates the first pointing device signal, the second pointing device signal, and a the third pointing device signal, wherein the first command includes a first pointing device command, the second command includes a second pointing device command, and the third command includes a third pointing device command;
    a processor configured to invoke the first pointing device command in response to the first touch signal land the first pointing device signal, the processor further configured to invoke the second pointing device command in response to the second touch signal and the second pointing device signal, the processor further configured to invoke the third pointing device command in response to the third touch signal and the third pointing device signal and
    wherein the first pointing device command is a browsing command in a first browsing mode, the second pointing device command is a switching command to switch the first browsing mode to a second browsing mode, and the third command is a browsing command in the second browsing mode, wherein the third command is different from the first command, wherein the first browsing mode is a vertical read mode, and the second browsing mode is a horizontal read mode, and the third command is a command to jump to a particular page.

2. The computer device of claim 1, wherein the processor is further configured to execute an application, the application runs a first process in response to the first pointing device command and runs a second process in response to the second pointing device command.

3. The computer device of claim 2, wherein the first human touch and the second human touch both target different positions on the touch screen.

4. The computer device of claim 2, wherein the application presents a graphic object on the touch screen, and the first human touch and the second human touch both target to the graphic object.

5. The computer device of claim 1, further comprising:
    a multimedia file browsing application, providing the first browsing mode and the second browsing mode;
    wherein the touch screen is configured to generate the first touch signal in response to the first human touch on a multimedia file presented on the touch screen by the multimedia file browsing application, and generate the second touch signal in response to the second human touch on the multimedia file.

6. The computer device of claim 5, wherein the touch screen is resistive type or inductive type.

7. The computer device of claim 5, wherein the first browsing mode and the second browsing mode are a page locking mode and a page dragable mode.

8. The computer device of claim 5, wherein the first browsing mode and the second browsing mode are a read-only mode and a highlight and notation mode.

9. The computer device of claim 5, wherein the first browsing mode and the second browsing mode are a full page mode and a column mode.

10. A computer program product comprising a non-transitory computer-readable medium storing a program code to be executed on a computer for causing the computer to perform operations including:
    receiving different pointing device operations by a user;
    generating, in response to the different pointing device operations by the user, a first pointing device signal, a second pointing device signal, and a third pointing device signal;
    predefining a first command in response to the different pointing device operations by the user of the pointing device that generates the first pointing device signal, the second pointing device signal and the third pointing device signal, wherein the first command includes a first pointing device command, and the second command includes a second pointing device command, and the third command includes a third pointing device command;
    in response to a first human touch on a touch screen of the computer and the first pointing device signal, invoking the first pointing device command;
    in response to a second human touch on the touch screen and the second pointing device signal, invoking the second pointing device command;
    in response to a third human touch on the touch screen and the third pointing device signal, invoking a third command;
    wherein the first human touch, the second human touch and the third human touch are different at least in pressure and duration of time applied by the user, and wherein the first pointing device command is a browsing command in a first browsing mode, the second pointing device command is a switching command to switch the first browsing mode to a second browsing mode, and the third command is a browsing command in the second browsing mode, wherein the third command is different from the first command, wherein the first browsing mode is a vertical read mode, and the second browsing mode is a horizontal read mode, and the third command is a command to jump to a particular page.

11. The computer program product of claim 10, further comprising program code for:
executing an application;
in response to the first pointing device command, the application running a first process; and
in response to the second pointing device command, the application running a second process.

12. The computer program product of claim 10, further comprising computer code for:
executing a multimedia file browsing application to present a multimedia file on the touch screen and provide the first browsing mode and the second browsing mode;
in the first browsing mode, in response to the first human touch on the multimedia file, invoking the first command;
in response to the second human touch on the multimedia file, invoking the second command.

13. A computer device, comprising:
a pointing device configured to, in response to different operations by a user, generate a first pointing device signal, a second pointing device signal, and a third pointing device signal;
a touch screen configured to, in response to a first human touch in a first position, generate a first touch signal, in response to a second human touch in a second position, generate a second touch signal, and in response to a third human touch in a third position, generate a third touch signal, wherein the first position, the second position, and the third position are different locations on the touch screen, wherein the first human touch, the second human touch and the third human touch are different in at least pressure and duration of time applied by the user;
an operating system configured to pre-define a first command, a second command, and a third command, in response to the different operations by the user of the pointing device that generates the first pointing device signal and the second pointing device signal and a third command, wherein the first command includes a first pointing device command, and the second command includes a second pointing device command and the third command includes a third pointing device command; and
a processor configured to invoke the first pointing device command in response to the first touch signal and the first pointing device signal, the processor further configured to invoke the second pointing device command in response to the second touch signal and the second pointing device signal, the processor further configured to invoke the third pointing device command in response to the third touch signal and the third pointing device signal invoke the third command, wherein the first pointing device command is a browsing command in a first browsing mode, and the second pointing device command is a switching command to switch the first browsing mode to a second browsing mode, and the third command is a browsing command in the second browsing mode, wherein the third command is different from the first command, wherein the first browsing mode is a vertical read mode, and the second browsing mode is a horizontal read mode, and the third command is a command to jump to a particular page.

* * * * *